(12) United States Patent
Jang et al.

(10) Patent No.: US 10,474,349 B2
(45) Date of Patent: Nov. 12, 2019

(54) MOBILE TERMINAL AND METHOD FOR CONTROLLING THE SAME

(71) Applicant: LG ELECTRONICS INC., Seoul (KR)

(72) Inventors: Yujune Jang, Seoul (JP); Youngjun Kim, Seoul (JP); Sungil Cho, Seoul (JP); Kangmin Kim, Seoul (JP)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/798,723

(22) Filed: Oct. 31, 2017

(65) Prior Publication Data

US 2018/0356953 A1 Dec. 13, 2018

(30) Foreign Application Priority Data

Jun. 7, 2017 (KR) ........................ 10-2017-0070982

(51) Int. Cl.
| | | |
|---|---|---|
| *G06F 17/00* | (2019.01) | |
| *G06F 3/0488* | (2013.01) | |
| *G06F 3/0485* | (2013.01) | |
| *G06F 3/0481* | (2013.01) | |
| *G06F 3/0484* | (2013.01) | |
| *G06F 3/041* | (2006.01) | |
| *H04M 1/02* | (2006.01) | |

(Continued)

(52) U.S. Cl.
CPC .......... *G06F 3/0488* (2013.01); *G06F 3/0414* (2013.01); *G06F 3/0484* (2013.01); *G06F 3/0485* (2013.01); *G06F 3/04817* (2013.01); *G06F 3/04842* (2013.01); *G06F 3/04883* (2013.01); *G06F 16/58* (2019.01); *G06F 16/739* (2019.01); *H04M 1/0202* (2013.01); *G06F 3/0482* (2013.01); *G06F 2203/04104* (2013.01); *G06F 2203/04108* (2013.01); *G06F 2203/04808* (2013.01); *H04M 2250/22* (2013.01)

(58) Field of Classification Search
CPC .... G06F 3/0414; G06F 3/0482; G06F 3/0488; G06F 3/0484; G06F 3/04883; G06F 2203/04808

See application file for complete search history.

(56) References Cited

U.S. PATENT DOCUMENTS

| | | | | |
|---|---|---|---|---|
| 9,448,704 | B1 * | 9/2016 | Belhumeur | .......... G06F 3/04842 |
| 2008/0015115 | A1 * | 1/2008 | Guyot-Sionnest | ...... G06F 3/014 506/24 |

(Continued)

FOREIGN PATENT DOCUMENTS

WO WO 2016/195178 A1 12/2016

*Primary Examiner* — Laurie A Ries
(74) *Attorney, Agent, or Firm* — Birch, Stewart, Kolasch & Birch, LLP

(57) ABSTRACT

A mobile terminal including a touch screen; and a controller configured to display a specific content on the touch screen, in response to a first force touch input satisfying a specific touch-force applied to the specific content, execute an aggregated view mode and display objects included in the specific content in an aggregated manner, in response to a first non-force touch input selecting a particular object, distinguishably display the selected particular object on the touch screen, and in response to a second force touch input satisfying the specific touch-force applied to the specific content, display related contents related to the selected particular object on the touch screen.

11 Claims, 17 Drawing Sheets

(51) Int. Cl.
*G06F 16/738* (2019.01)
*G06F 16/58* (2019.01)
*G06F 3/0482* (2013.01)

(56) References Cited

U.S. PATENT DOCUMENTS

| | | | |
|---|---|---|---|
| 2010/0026640 A1* | 2/2010 | Kim | G06F 3/0414 345/173 |
| 2010/0085318 A1* | 4/2010 | Lee | G06F 3/04883 345/173 |
| 2010/0260426 A1 | 10/2010 | Huang et al. | |
| 2012/0044153 A1* | 2/2012 | Arrasvuori | G06F 3/0482 345/173 |
| 2014/0123081 A1* | 5/2014 | Park | G06F 21/36 715/863 |
| 2014/0282283 A1* | 9/2014 | Glebocki | G06F 3/04815 715/863 |
| 2014/0313143 A1* | 10/2014 | Jung | G06F 3/041 345/173 |
| 2015/0012860 A1* | 1/2015 | Cha | G06F 3/0486 715/769 |
| 2015/0052430 A1* | 2/2015 | Dwan | G06F 3/0482 715/702 |
| 2015/0153951 A1* | 6/2015 | Kim | G06F 3/0414 715/773 |
| 2015/0215245 A1* | 7/2015 | Carlson | G06F 3/04883 715/752 |
| 2015/0334075 A1* | 11/2015 | Wang | G07C 13/00 715/752 |
| 2016/0092063 A1* | 3/2016 | Lee | G06F 3/0416 345/173 |
| 2016/0103830 A1* | 4/2016 | Cheong | G06F 3/0488 715/738 |
| 2016/0134740 A1* | 5/2016 | Gal | H04M 1/72522 455/456.3 |
| 2016/0140934 A1* | 5/2016 | Frieder | H04W 4/21 345/156 |
| 2016/0231888 A1* | 8/2016 | Govindraj | G06F 3/0482 |
| 2016/0328140 A1* | 11/2016 | Zhang | H04L 51/04 |
| 2017/0025151 A1* | 1/2017 | Han | G06F 3/0488 |
| 2017/0038926 A1* | 2/2017 | Fram | G06F 3/0487 |
| 2017/0123571 A1* | 5/2017 | Huang | G06F 3/0488 |
| 2017/0131896 A1* | 5/2017 | Park | G06F 3/04883 |
| 2018/0188911 A1* | 7/2018 | Wang | G06F 3/0488 |
| 2018/0292974 A1* | 10/2018 | Lee | G06F 3/04817 |
| 2019/0146643 A1* | 5/2019 | Foss | G06F 3/0482 |

* cited by examiner

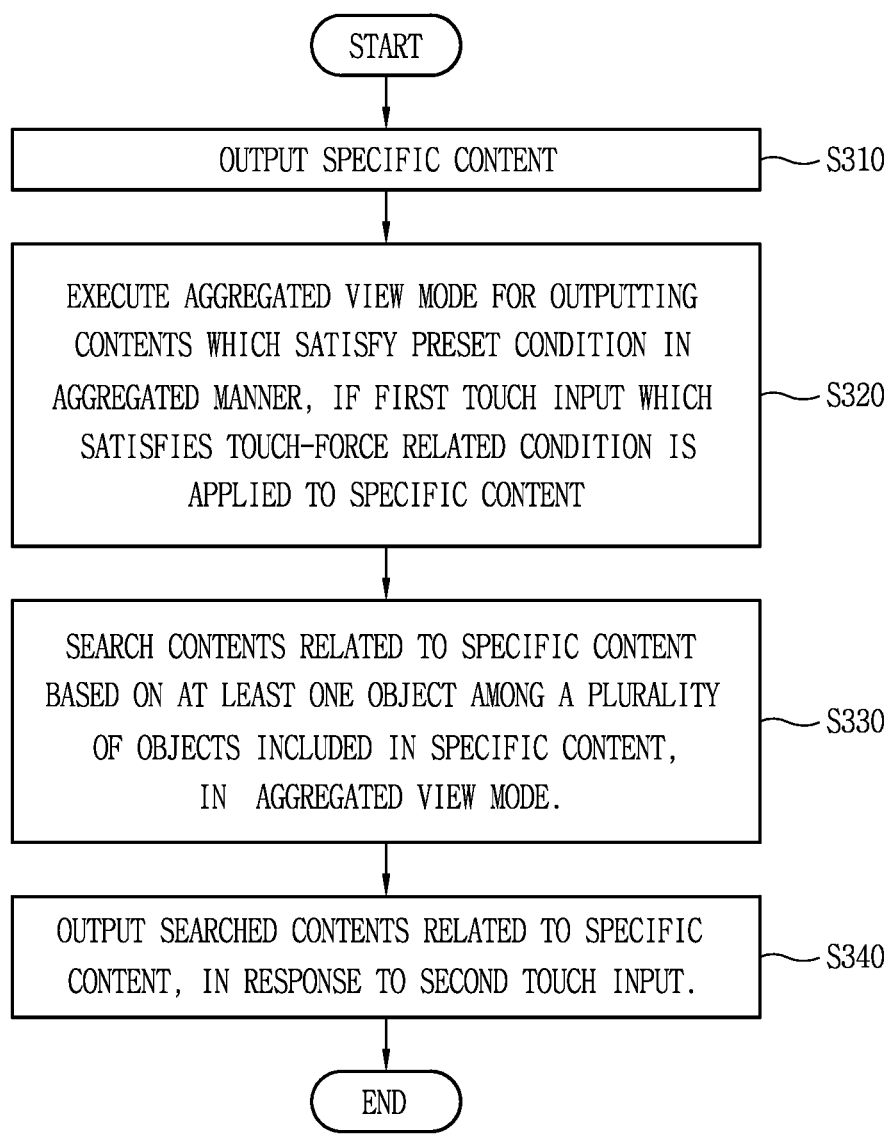

FIG. 9
(a) 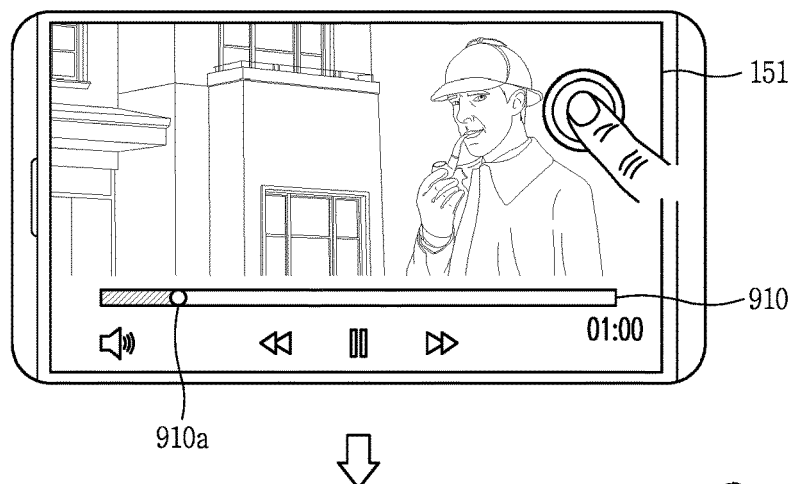
(b) 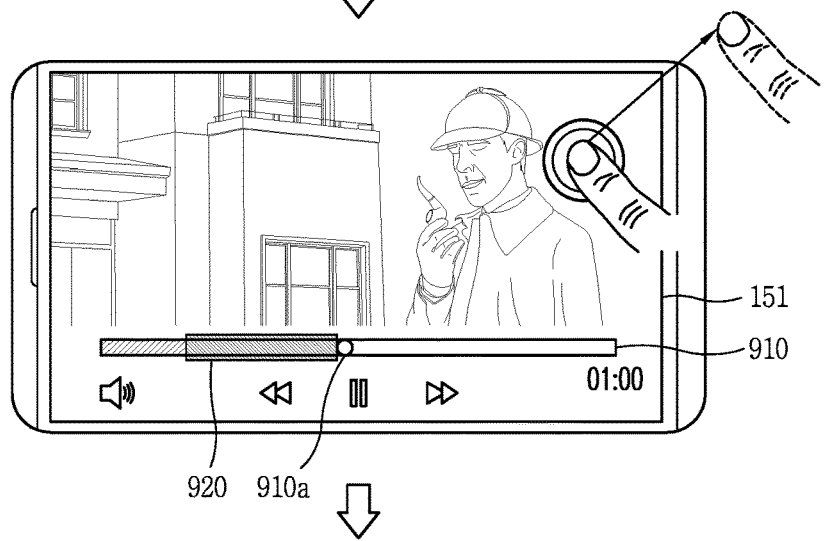
(c) 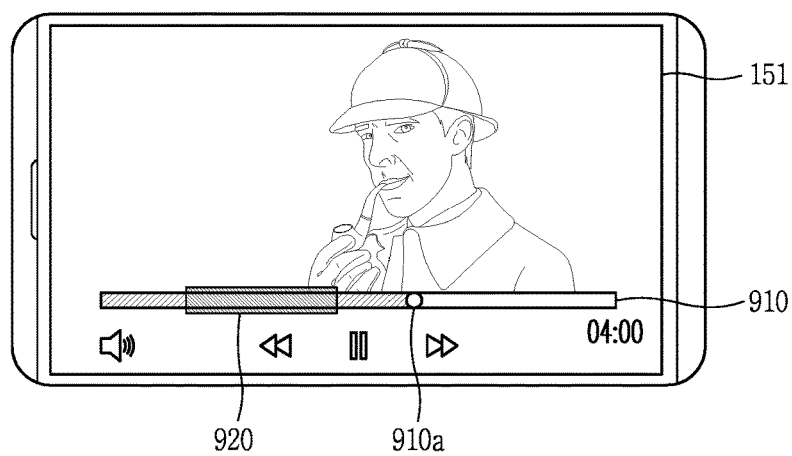

FIG. 10
(a)
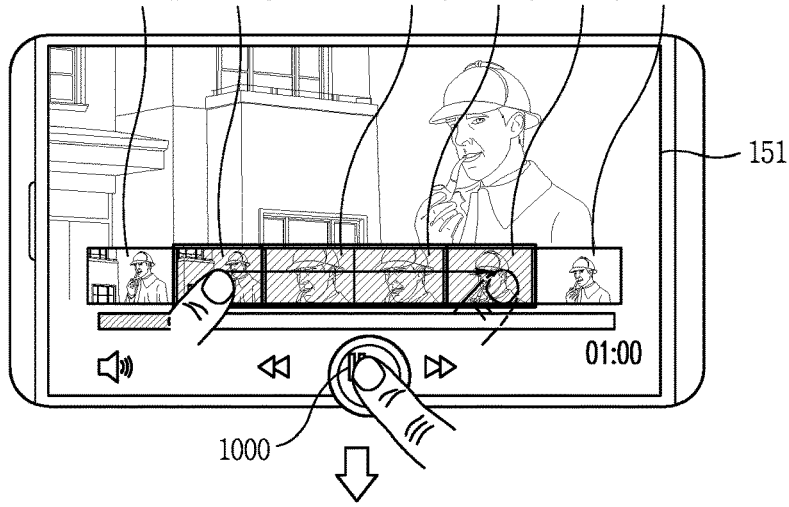
(b)
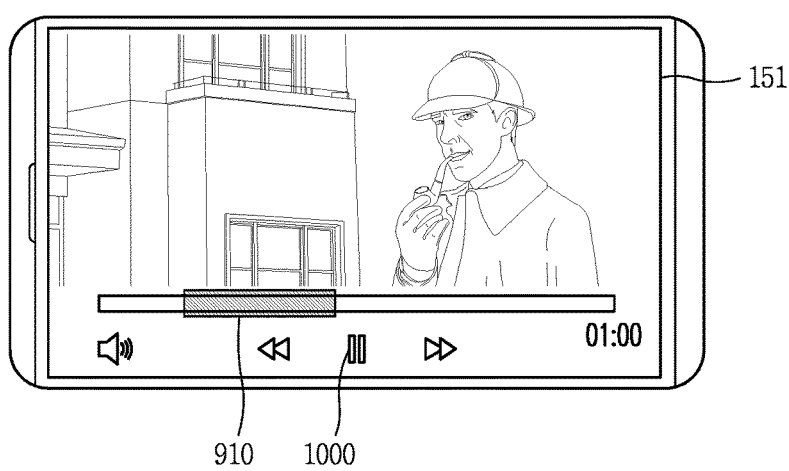
(c)

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2017-0070982, filed on Jun. 7, 2017, the contents of which are incorporated by reference herein in its entirety.

BACKGROUND OF THE INVENTION

1. Field of the Invention

This specification relates to a mobile terminal capable of providing a function to rapidly search and appreciate contents, and a method for controlling the same.

2. Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, a new interface using technology to recognize a force of a touch input applied to a touch screen is being developed. Accordingly, it is required to develop various user interfaces using a touch force of a touch input as well as the conventional touch type.

As a multimedia technique and a memory technique of the mobile terminal are developed, a usage amount of multimedia contents through the mobile terminal is increased. However, there is a problem in searching for contents by a user, due to such an increased usage amount of the multimedia contents.

SUMMARY OF THE INVENTION

Therefore, an aspect of the detailed description is to provide a mobile terminal capable of searching contents easily and rapidly.

Another aspect of the detailed description is to provide a mobile terminal capable of editing contents easily.

To achieve these and other advantages and in accordance with the purpose of this specification, as embodied and broadly described herein, there is provided a mobile terminal including a touch screen configured to display a specific content; and a controller configured to execute an aggregated view mode for outputting contents in an aggregated manner, if a first touch input which satisfies a touch-force related condition is applied to the specific content, configured to search contents related to the specific content based on at least one object among a plurality of objects included in the specific content, if the aggregated view mode is executed, and configured to output the contents related to the specific content in an aggregated manner.

According to another aspect of the present invention, there is provided a mobile terminal including a touch screen configured to output a play screen of a video; and a controller configured to extract a partial play section of the video, if a touch input which satisfies a touch-force related condition is applied to the play screen, and configured to generate a summary of the video based on the extracted partial play section, wherein the partial play section of the video corresponds to a play section between a time when the touch input has been sensed and a time when the touch input has been released.

To achieve these and other advantages and in accordance with the purpose of this specification, as embodied and broadly described herein, there is also provided a method for controlling a mobile terminal, the method including outputting a play screen of a video; extracting a partial play section of the video, if a touch input which satisfies a touch-force related condition is applied to the play screen; and generating a summary of the video based on the extracted partial play section, wherein the partial play section of the video corresponds to a play section between a time when the touch input has been sensed and a time when the touch input has been released.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flowchart showing a method for searching contents related to objects included in a specific content, in a mobile terminal according to an embodiment of the present invention;

FIG. 9 is a conceptual view illustrating a control method of FIG. 8;

FIGS. 10 and 11 are conceptual views showing a method for setting a detailed play section at the time of generating a video summary;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
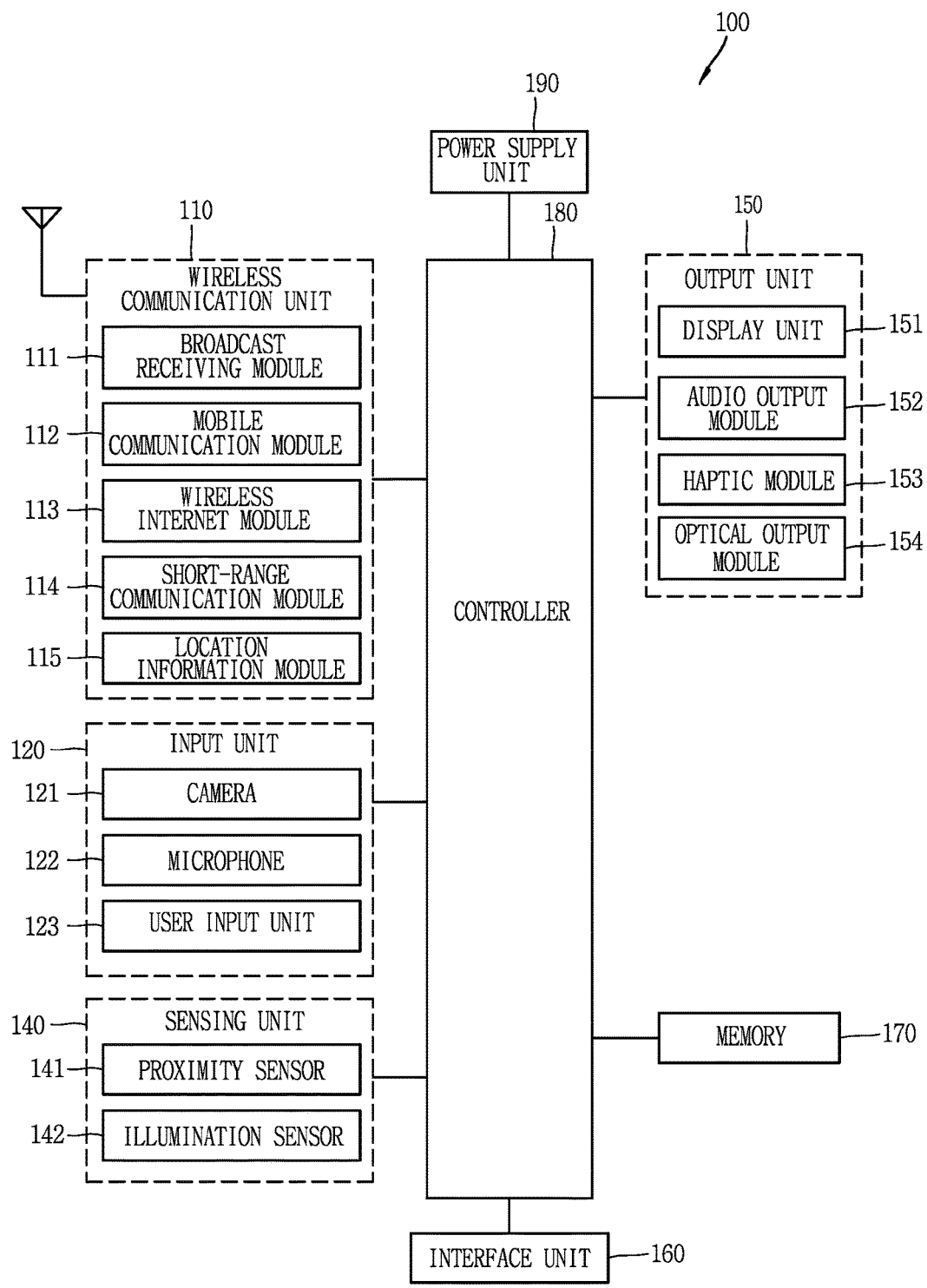
FIG. 1A is a block diagram illustrating a mobile terminal according to an embodiment of the present invention.
Figure 1B:
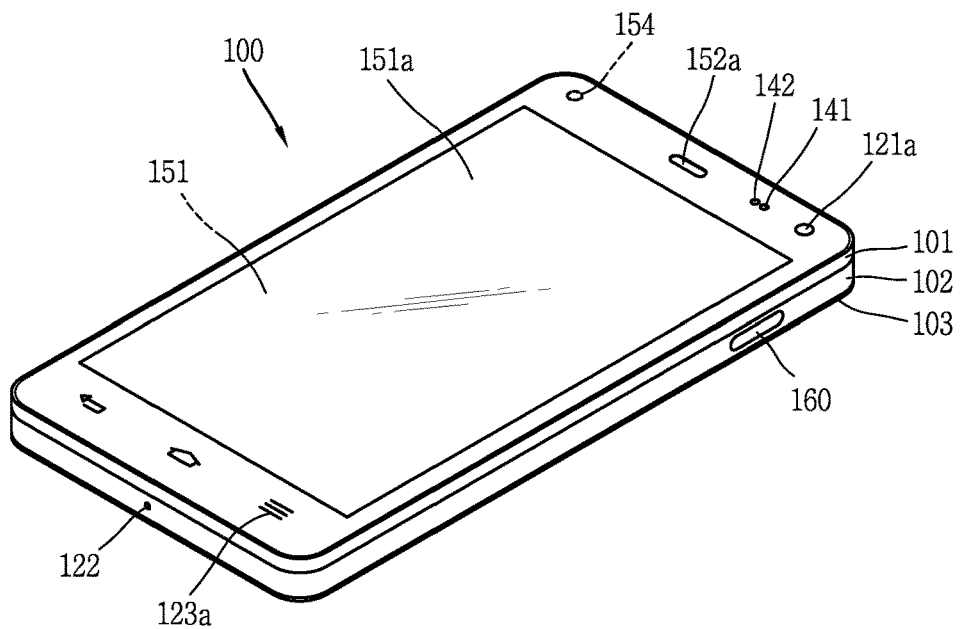
FIGS. 1B and 1C are conceptual views illustrating an example of a mobile terminal according to an embodiment of the present invention, which are viewed from different directions.
Figure 1C:
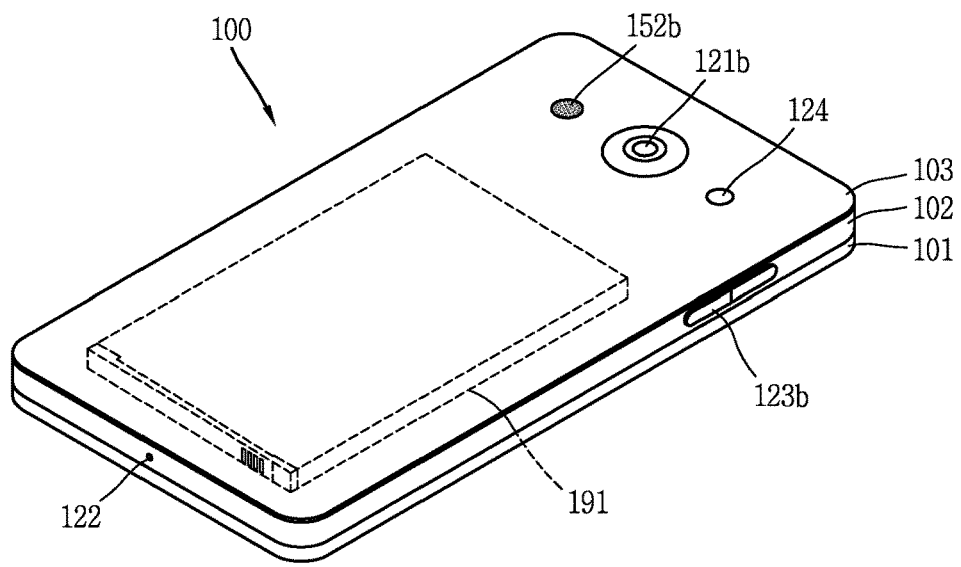

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, And, the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a water-proofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, And the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, And the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, And the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, And the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, And the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, And the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), And the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, And the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, And the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, And the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 2A:
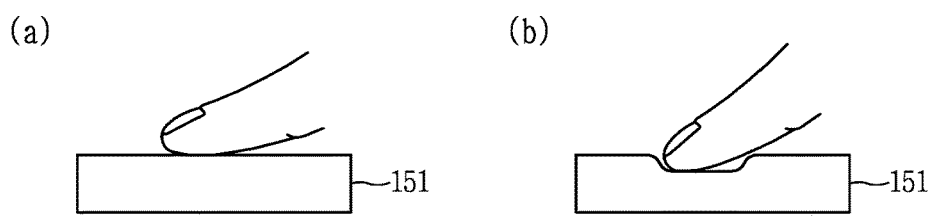
FIGS. 2A and 2B are conceptual views showing a touch input which satisfies a touch force-related condition, in a mobile terminal according to an embodiment of the present invention.
Figure 2B:
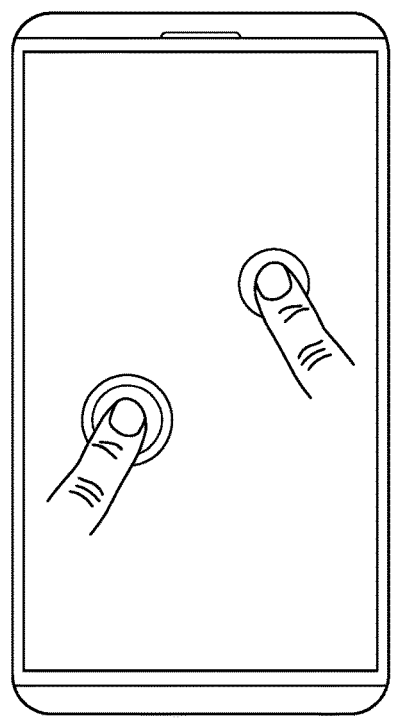

Next, FIG. 2A is a conceptual view showing a general touch input, and a touch input which satisfies a touch force-related condition according to an embodiment of the present invention, and FIG. 2B is a conceptual view showing a multi force touch.

The touch sensor of the present invention can sense a touch force of a touch input. The touch force means a pressure applied to a touch screen by a touch object. That is, the touch sensor can sense a touch area and a touch force. When there is a touch input sensed by the touch sensor, signals corresponding to the touch input are transmitted to a touch controller. The touch controller processes the signals, and then transmits corresponding data to the controller 180. The controller 180 can determine a touch input according to whether a touch force of the touch input satisfies a touch force-related condition.

The touch force-related condition can be that a touch force is more than a reference force. The reference force may be preset when the mobile terminal is manufactured.

More specifically, as shown in FIG. 2A(a), the touch sensor can sense a contact of a touch object (e.g., a finger) onto the touch screen 151. And the touch sensor can sense a touch force of a touch input applied to the touch screen. If the sensed touch force of the touch input is less than a reference force, the controller 180 can determine the touch input as a general touch input.

As shown in FIG. 2A(b), the touch sensor can sense a touch force of a touch input applied to the touch screen 151 by a touch object (e.g., a finger). In this instance, if the sensed touch force of the touch input is greater than the reference force, the controller 180 can determine the touch input as a force touch input. In this specification, the force touch input is a term indicating a touch input having a touch force more than a reference force. The term may be arbitrarily changed by those skilled in the art. That is, the term may be replaced by a force touch, a pressurizing force touch, a pressurizing touch input, a pressurizing touch, etc.

The reference force may be plural. For instance, the reference force may be set as a second force larger than a first force. In this instance, for a touch input having a touch force between the first force and the second force and a touch input having a touch force between the second force and a third force, the controller 180 can determine the touch inputs as different touch inputs.

Accordingly, the controller 180 can perform a different function based on a touch force of a touch input. For instance, the controller 180 can perform a message application when a touch input is applied to a message icon with a first touch force. And the controller 180 can perform a preview function on an execution screen of the message application when a touch input is applied to the message icon with a second touch force.

The touch sensor can sense more than two touch inputs applied to the touch screen. Such touch inputs can be called multi touch inputs. As shown in FIG. 2B, when at least one of the multi touch inputs has a touch force more than a reference force, the controller 180 can recognize the touch input as a multi-force touch input. For instance, the multi touch inputs may include one touch input of a force touch input, and another touch input of a drag input. As another example, the multi touch inputs may include one touch input of a force touch input, and another touch input of a short touch input. As another example, the multi touch inputs may include two touch inputs of force touch inputs.

In the following descriptions, at least two touch inputs including at least one touch input having a touch force more than a reference force will be called multi force touch inputs. However, such a term may be changed by those skilled in the art, and may be replaced by another term having the same meaning.

Figure 4:
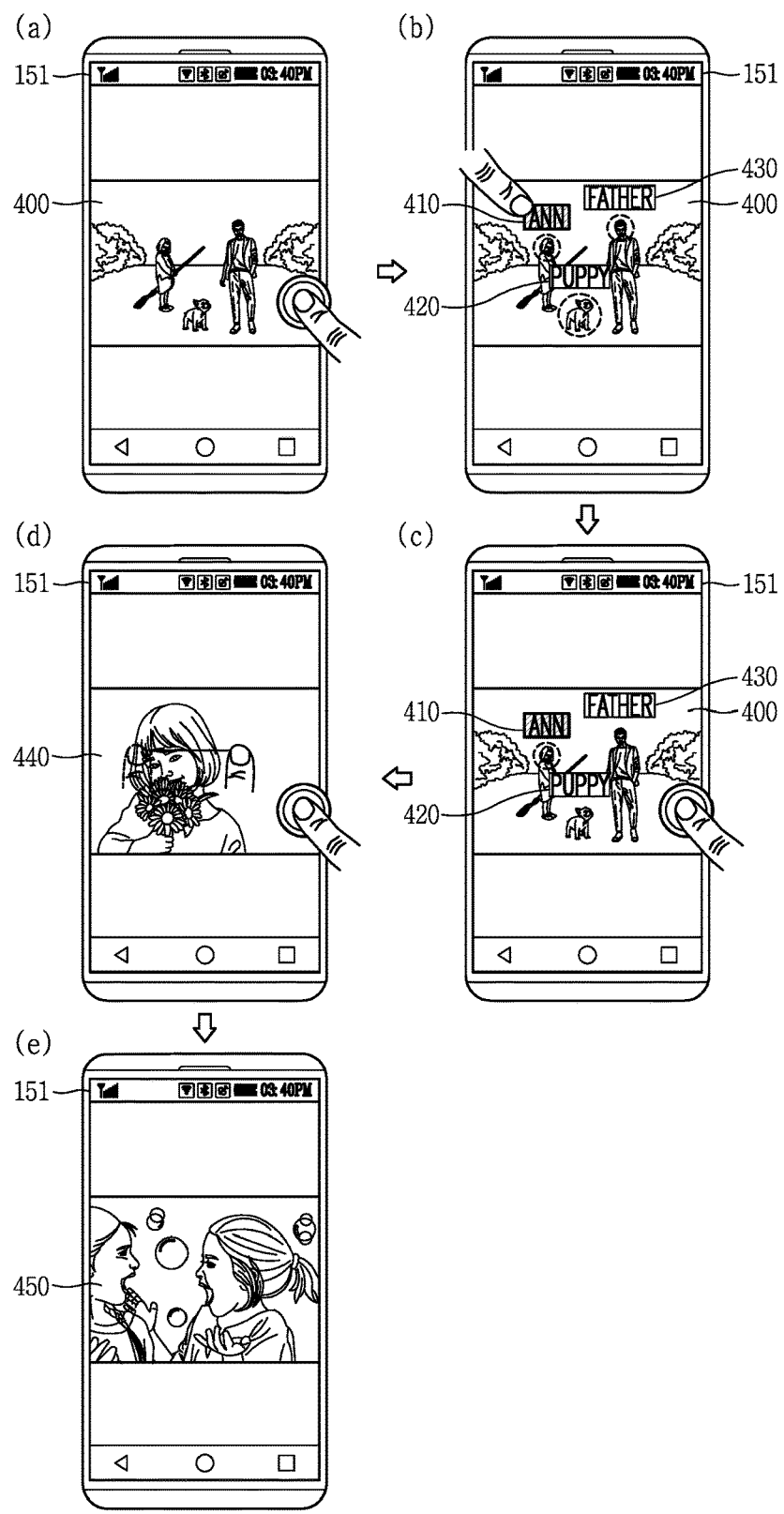
FIGS. 4 and 5 are conceptual views showing a control method of FIG. 3.

So far, a touch input which satisfies a touch force-related condition has been explained. Hereinafter, a method for easily and rapidly searching contents related to a specific content, by utilizing a force touch input in the mobile terminal according to an embodiment of the present invention will be explained. In particular, FIG. 3 is a flowchart showing a method for searching contents related to a specific content, by utilizing a force touch input in the mobile terminal according to an embodiment of the present invention, and FIG. 4 is a conceptual view showing a control method of FIG. 3.

Referring to FIG. 3, the controller 180 can output a specific content (S310). The controller 180 can execute a gallery application. The gallery application provides a function to output contents to a touch screen and can provide a content edition function. The gallery application may be called a photo application, a video play application or the like which provides the same function. The controller 180 can perform the gallery application based on a touch input applied to an icon of the gallery application.

Once the gallery application is executed, the controller 180 can output a specific content to the touch screen. The content includes information which can be processed in the mobile terminal. More specifically, the content can be various types of information such as a video, an image and an audio. The content can also be stored in the memory 170 of the mobile terminal, or an external server. If the content is stored in the external server, the controller 180 can receive the content from the external server through communications.

And the controller 180 can output a specific content based on a user's control command. For instance, the controller 180 can output a specific content to the touch screen, in response to a touch input applied to a thumbnail image of the specific content.

If a first touch input which satisfies a touch force-related condition is applied to the specific content, the controller 180 can execute an aggregated view mode for outputting contents which satisfy a specific condition in an aggregated manner (S320). Further, the controller 180 can sense a first touch input which satisfies a touch-force related condition and which is applied to the specific content. The first touch input is a force touch input.

The controller 180 can perform an aggregated view mode, in response to a force touch input applied to the specific content. The aggregated view mode is a mode for providing a function to output contents which satisfy a specific condition to a single page in an aggregated manner. The specific condition may be set by a user. Accordingly, a user can extract only necessary contents from a plurality of contents, and check the extracted contents on a single page.

If a long touch input rather than a force touch input is applied to the specific content, the controller 180 can not perform the aggregated view mode. In this instance, the controller 180 can output an edition icon related to the specific content. In the aggregated view mode, the controller 180 can search for contents related to the specific content, based on at least one object among a plurality of objects included in the specific content (S330).

Once the aggregated view mode is executed, the controller 180 can extract a plurality of objects included in the specific content. For this, the controller 180 can analyze the specific content based on an image analysis algorithm. The image analysis algorithm is used to analyze an image, extract objects included in the image, and recognize the extracted objects.

The controller 180 can extract objects included in the specific content, based on an analysis result of the specific content. The objects may include a person or a thing included in the content, a place corresponding to a background, a time indicated by a background (e.g., day or night), etc. For instance, from an image indicating a person captured in a forest, objects such as 'person', 'forest', 'trees' and 'day' may be extracted.

Once the plurality of objects are extracted, the controller 180 can output a plurality of icons indicating the plurality of objects. The controller 180 can select at least one object corresponding to at least one icon, based on a touch input applied to the at least one icon among the plurality of icons. Here, the touch input applied to the icon is a touch input which does not satisfy a touch force-related condition. For instance, a second touch input may be a short touch. With such a configuration, in the present invention, when contents related to a specific content are searched, at least one object included in the specific content may be determined.

The controller 180 can output contents related to the searched specific content, in response to the second touch input (S340). If the second touch input which satisfies a touch force-related condition is applied in a selected state of at least one object, the controller 180 can search for contents related to the specific content, based on the selected at least one object. Here, the second touch input can be a force touch input.

The contents related to the specific content may be one or more contents including the selected at least one object. That is, the controller 180 can search for contents based on each object included in the specific content, not based on a similarity with the specific content.

If the selected objects are plural, the controller 180 can search for relevant contents by combining the plurality of selected objects with each other. More specifically, the controller 180 can search relevant contents by using one of a first method for searching contents including all of the plurality of objects, and a second method for searching contents including at least one of the plurality of objects.

For instance, when searching contents using the first method, if a first object and a second object are selected, the controller 180 can search contents including all of the first and second objects. As another example, when searching contents using the second method, the controller 180 can search contents including at least one of the first and second objects. The content search method can be set by a user, or can be preset to the mobile terminal.

The controller 180 can maintain the output of the relevant contents while the second touch input is maintained. That is, the controller 180 can not output the relevant contents when the second touch input is not sensed any longer. If the output of the relevant contents is terminated, the controller 180 can return to the state before the relevant contents are output. That is, the controller 180 can re-output the specific content including at least one object.

Alternatively, if the second touch input is not maintained any longer, the controller 180 can terminate the aggregated view mode. In this instance, the controller 180 can return to the state before an object included in the specific content is extracted. This allows the mobile terminal to easily enter an aggregated view mode or to easily terminate the aggregated view mode.

Hereinafter, an embodiment to execute an aggregated view mode will be explained with reference to FIG. 4. Referring to FIG. 4(*a*), the controller 180 can output a specific content 400 to the touch screen 151. Further, the controller 180 can sense a force touch input applied to the specific content. The force touch input may be applied to any region of the specific content.

As shown in FIG. 4(*b*), the controller 180 can execute an aggregated view mode in response to the force touch input. Once the aggregated view mode is executed, the controller 180 can extract a plurality of objects included in the specific content. Then, the controller 180 can output a plurality of icons 410, 420, 430 indicating the plurality of extracted objects.

The plurality of icons 410, 420, 430 can be output to peripheral regions of the output regions of the plurality of objects. That is, an object and an icon indicating the object can be output to regions adjacent to each other. This allows a user to intuitively recognize a relation between the object and the icon. The controller 180 can output icons indicating a plurality of objects in the form of a list. That is, the icon output method may be implemented as various methods rather than the method disclosed in the specification.

Further, the controller 180 can select an object indicated by at least one icon, based on a touch input applied to the at least one icon among the plurality of icons. For instance, as shown in FIG. 4(*b*), the controller 180 can select an object 'ANN' indicated by a first icon 410, based on a touch input applied to the first icon 410 among a plurality of icons 410, 420, 430. The controller 180 can search relevant contents related to the specific content 400, based on the object 'ANN'. More specifically, the controller 180 can search contents including the object 'ANN'.

Referring to FIG. 4(*c*), the controller 180 can sense a force touch input again when the first icon 410 has been selected. In this instance, as shown in FIG. 4(*d*), the controller 180 can output a relevant content 440 including the object 'ANN' corresponding to the first icon 410, to the touch screen 151.

And the searched relevant content may be plural. Further, the controller 180 can sequentially output the relevant contents based on a user's control command. For instance, as shown in FIG. 4(*e*), the controller 180 can output a new relevant content 450 different from the output relevant content 440, in response to a swipe touch input applied to the content 440 including the object 'ANN'. That is, the controller 180 can sequentially output the searched relevant contents when a swipe touch input is applied in an aggregated view mode. In this instance, contents rather than the relevant contents are not output to the touch screen.

Alternatively, if a swipe touch input is applied to the specific content in a non-executed state of an aggregated view mode, the controller 180 can sequentially output other contents in a stored order in the memory 170. That is, the controller 180 can output contents in a different manner according to whether an aggregated view mode has been executed or not. Thus, relevant contents related to at least one object included in a specific content can be searched easily and rapidly, and a user can conveniently access the relevant contents through a simple manipulation.

Figure 5:
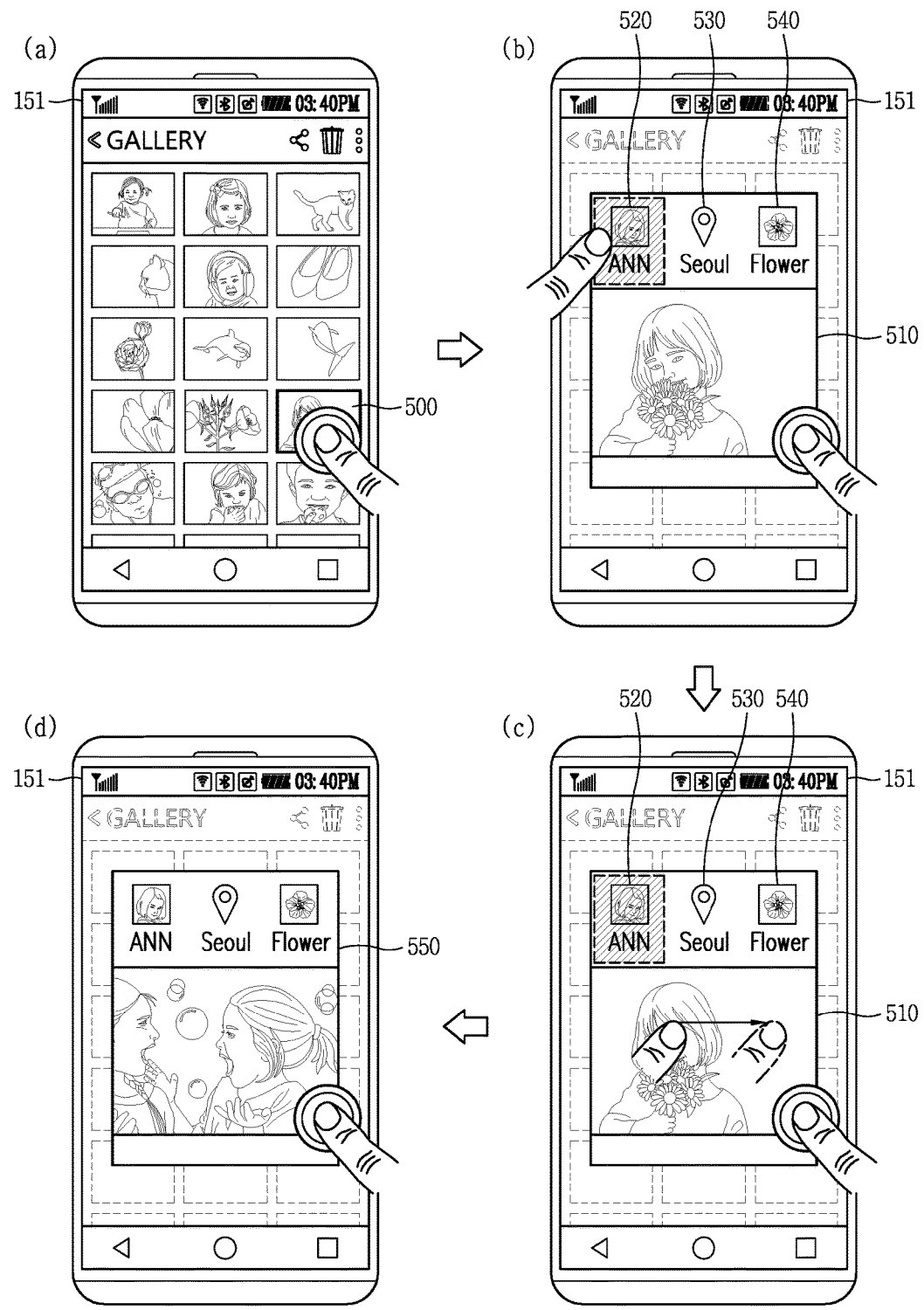

Further, relevant contents may be provided in a different manner from the aforementioned one. Referring to FIG. 5(*a*), the controller 180 can output, to the touch screen 151, thumbnail images of some contents among a plurality of contents stored in the memory 170. The controller 180 can output a preview screen 510 of a specific content indicated by a specific thumbnail image 500, in response to a force touch input applied to the specific thumbnail image 500 among the thumbnail images of some contents. Here, the preview screen is a screen output by reducing a capacity of a content before the content is output to the touch screen, or a screen output with a reduced size.

Referring to FIG. 5(*b*), if a force touch input is applied to a specific object included in the specific content on the preview screen 510, the controller 180 can output icons 520, 530, 540 indicating a plurality of objects included in the specific content. The icons 520, 530, 540 indicating the plurality of objects may have contracted object images. The controller 180 can output the icons 520, 530, 540 indicating the plurality of objects, to an upper end of the preview screen.

That is, in order to solve the conventional problem that a plurality of objects and a plurality of icons indicating the plurality of objects are output with a small size due to a characteristic of a preview screen, icons are output to an additional output region. Accordingly, an output size of the icons can be obtained. This allows a user to select the icons in a more convenient manner. If a touch input is applied to the icon 520 indicating the object 'ANN' among the icons 520, 530, 540 indicating the plurality of objects, the controller 180 can search relevant contents related to the specific content based on the object 'ANN'.

Referring to FIGS. 5(*c*) and 5(*d*), the controller 180 can output a preview screen 550 of the searched relevant contents, in response to a swipe touch input. Further, the controller 180 can sequentially output the searched relevant contents, according to the number of times of swipe touch inputs. That is, a user can easily access relevant contents through a preview screen.

If the force touch input sensed in FIG. 5(*a*) is not sensed any longer, the controller 180 can not output the preview screen any longer. In this instance, the thumbnail images of some contents which have been output before the output of the preview screen can be re-output to the touch screen 151.

So far, a method for easily searching and accessing a relevant content related to a content by using a force touch input has been explained. With such a configuration, a user can easily access a relevant content through a preview screen, without directly checking various contents. This enhances a user's content search speed.

Figure 6:
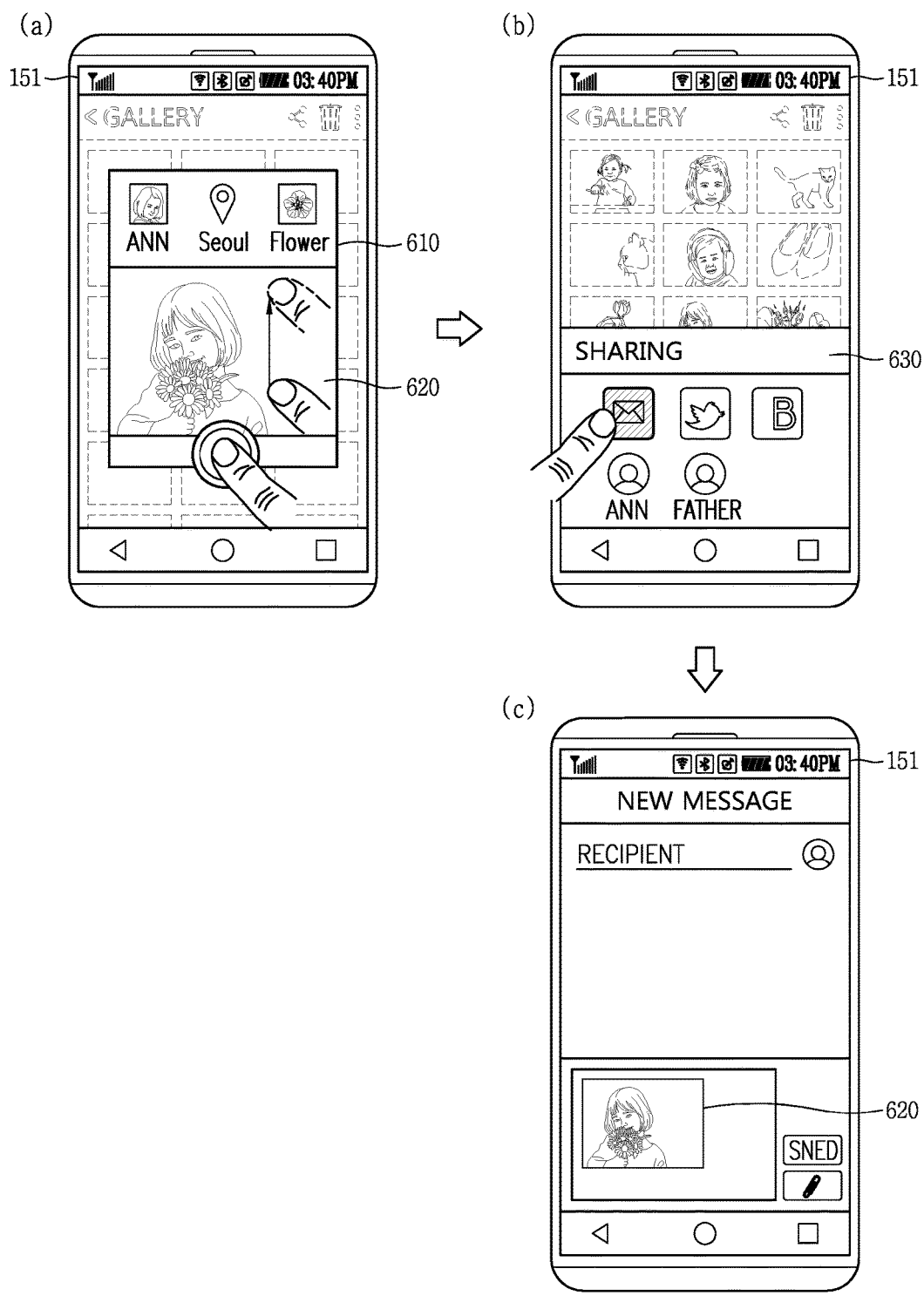
FIG. 6 is a conceptual view illustrating a method for executing an additional function by using relevant contents searched in a mobile terminal according to an embodiment of the present invention.

Hereinafter, a method for searching a relevant content and then executing an additional function with respect to the relevant content, by utilizing a force touch input will be explained. In particular, FIG. 6 is a conceptual view illustrating a method for executing a sharing function by using a relevant content searched in the mobile terminal according to an embodiment of the present invention. Also, FIGS. 7A to 7D are conceptual views showing a content editing method using a touch input which satisfies a touch force-related condition, in the mobile terminal according to an embodiment of the present invention.

The controller 180 can search a relevant content related to a specific content, based on an object included in the specific content. Further, the controller 180 can execute an additional function by using the searched relevant contents, according to a user's control command. The additional function may be to transmit contents to an external terminal, a sharing function to upload contents to an external server, or a content edition function.

Referring to FIG. 6(*a*), the controller 180 can perform a sharing function based on a drag input applied in a preset direction to a preview screen 610 indicating a relevant content 620. The preset direction may be an upward direction of the mobile terminal.

Referring to FIG. 6(*b*), once the sharing function is performed, the controller 180 can output a sharing object list 630 for selecting an object to share the relevant content. The sharing object list 630 may include contact information stored in the memory 170, an icon of an application which provides a content upload function to an external server, an icon of a message application, and an icon of a memo application. A user can select a content sharing object using the sharing object list 630.

As shown in FIG. 6(*c*), the controller 180 can execute a message application in response to a touch input applied to an icon of the message application. Here, the controller 180 can output the relevant content 620 to a message input window among an execution screen of the message application. Accordingly, a user can transmit a message including the relevant content, without an operation to attach the relevant content.

The controller 180 can execute a content edition function using a multi force touch input. The content edition function may include a content brightness control function, a content color control function, a content edition cancellation function, and an edited content storage function.

Figure 7A:
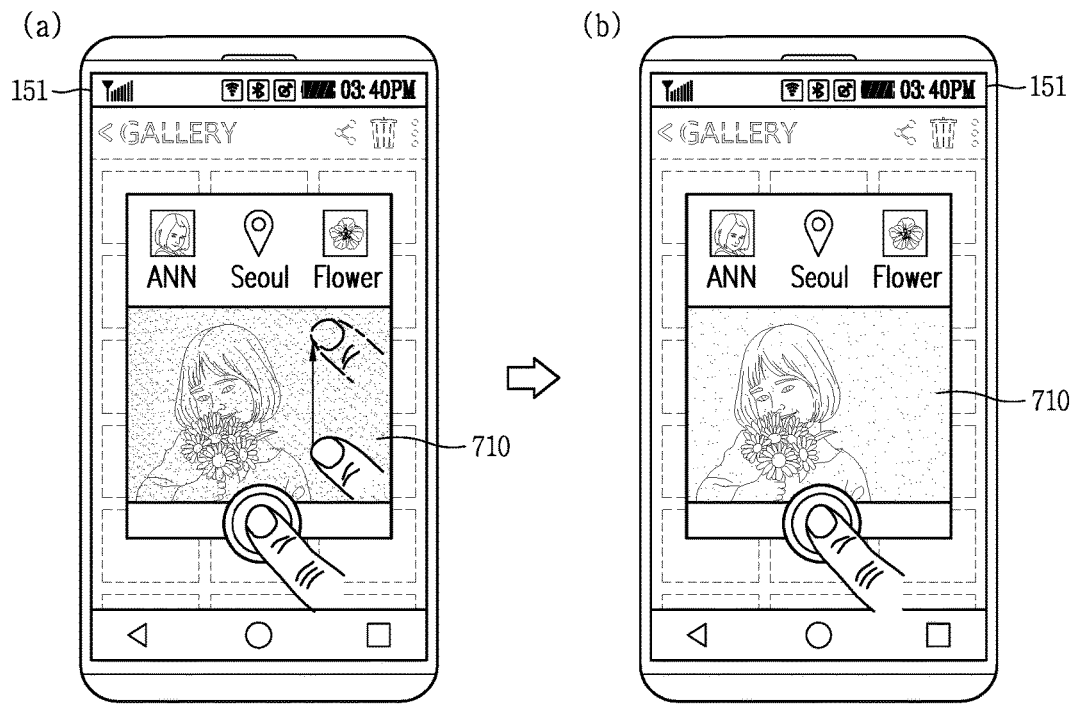
FIGS. 7A to 7D are conceptual views showing a content editing method using a touch input which satisfies a touch force-related condition, in a mobile terminal according to an embodiment of the present invention.

The controller 180 can execute a different edition function according to a touch type of a multi force touch input. Hereinafter, detailed embodiments will be explained with reference to FIGS. 7A to 7D. As shown in FIG. 7A(a), the controller 180 can sense a multi force touch input applied to a preview screen of a specific content 710. The multi force touch input may be formed as a force touch input and an up-down drag input applied to a right region based on a force touch input sensing region. In this instance, the controller 180 can control a brightness of the specific content 710.

For instance, as shown in FIG. 7A(b), if an upward drag input is applied when a force touch input has been applied, the controller 180 can increase a brightness of the specific content 710. On the contrary, if a downward drag input is applied when a force touch input has been applied, the controller 180 can decrease a brightness of the specific content 710.

Figure 7B:
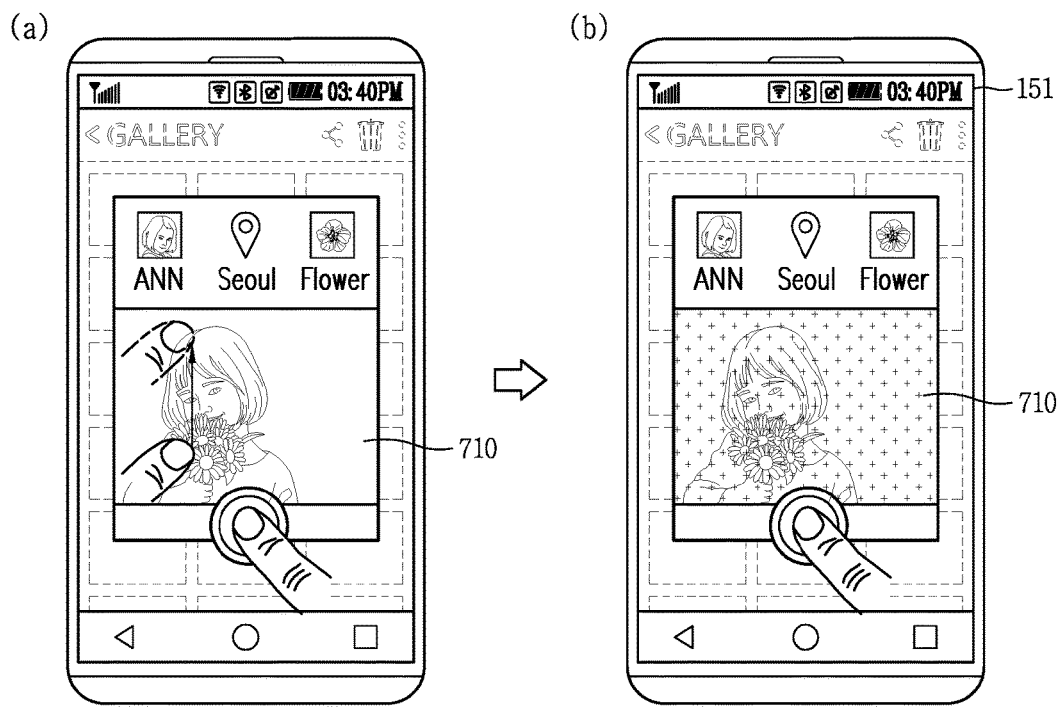

As shown in FIG. 7B(a), the controller 180 can sense a multi force touch input applied to the preview screen of the specific content 710. The multi force touch input may be formed as a force touch input and an up-down drag input applied to a left region based on a force touch input sensing region. In this instance, the controller 180 can control a chroma of the specific content 710. For instance, as shown in FIG. 7A(b), if an upward drag input is applied, the controller 180 can control a chroma of the specific content 710 to be high.

Figure 7C:
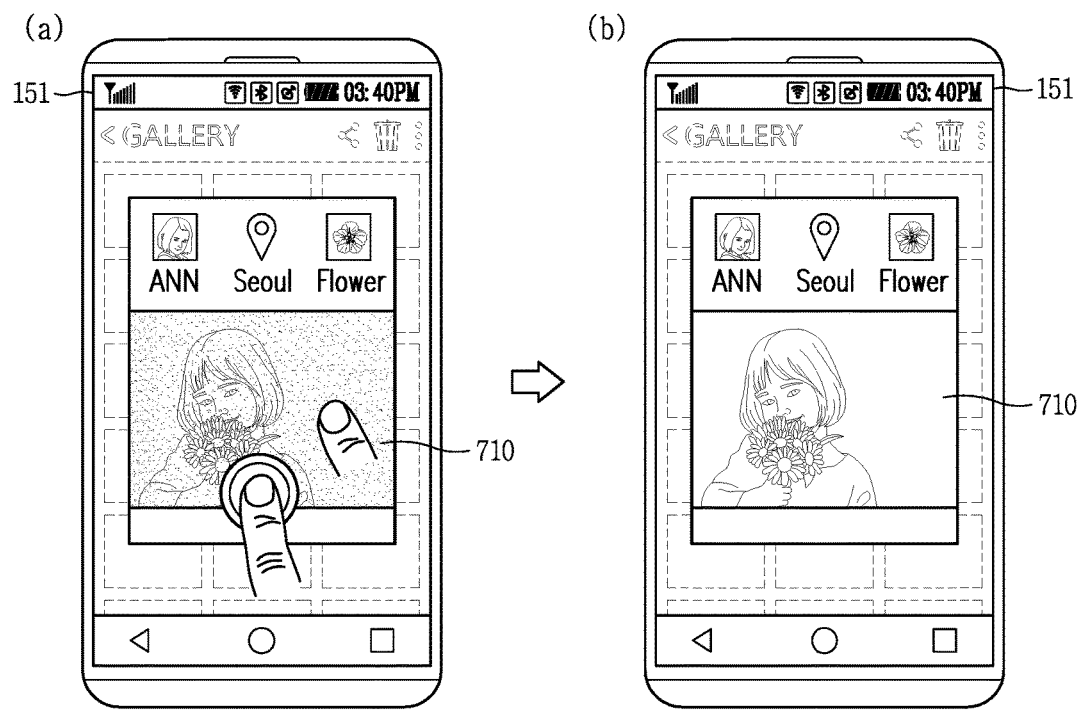

Referring to FIGS. 7C(a) and (b), if a force touch input and a short touch input are simultaneously sensed on the specific content 710, the controller 180 can cancel a content edition function executed immediately before the short touch input is applied. For instance, the controller 180 can control a brightness of the specific content to be low. Then, if a force touch input and a short touch input are simultaneously sensed, the controller 180 can control the mobile terminal to return to the state before the brightness of the specific content is controlled to be low.

Figure 7D:
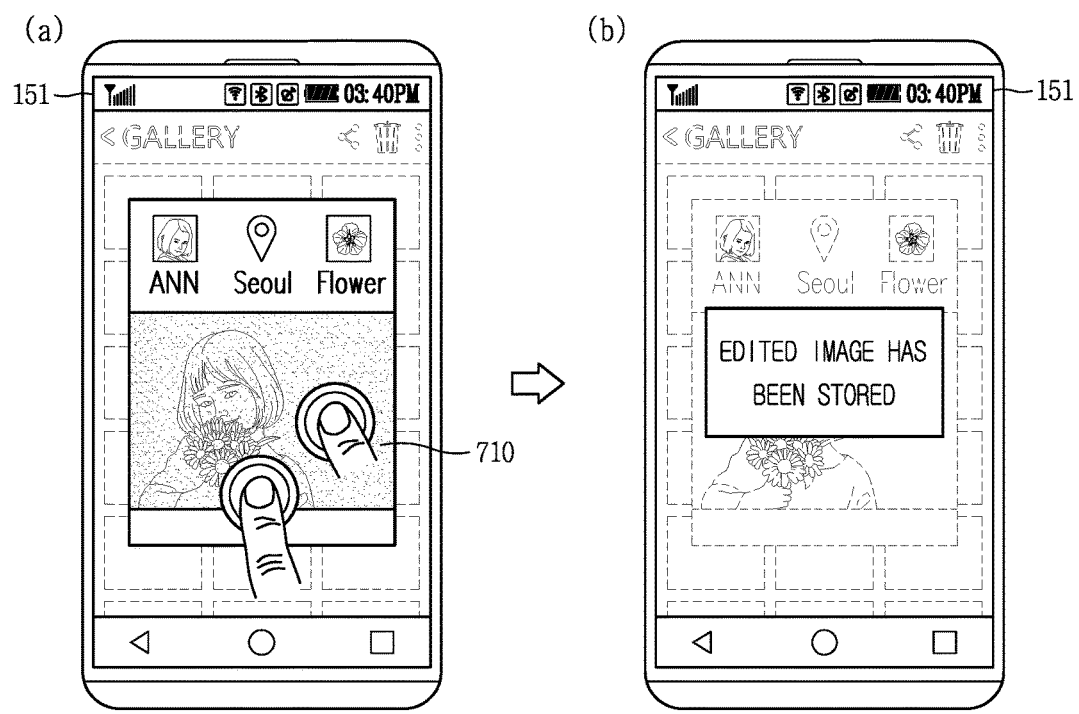

Finally, as shown in FIG. 7D(a), if a force touch input is simultaneously applied to two different regions, the controller 180 can store the edited content. In this instance, as shown in FIG. 7D(b), the controller 180 can output notification information indicating that the content has been stored, to the touch screen 151. And the controller 180 can output a specific content in an enlarged or contracted manner, in response to a simultaneous input of a force touch input and a pinch-in input (or a pinch-out input).

So far, a method for editing a specific content by utilizing an additional touch input applied when a force touch input is maintained after an output of a preview screen has been explained. Thus, a user can easily edit contents on a preview screen without outputting the contents.

Figure 8:
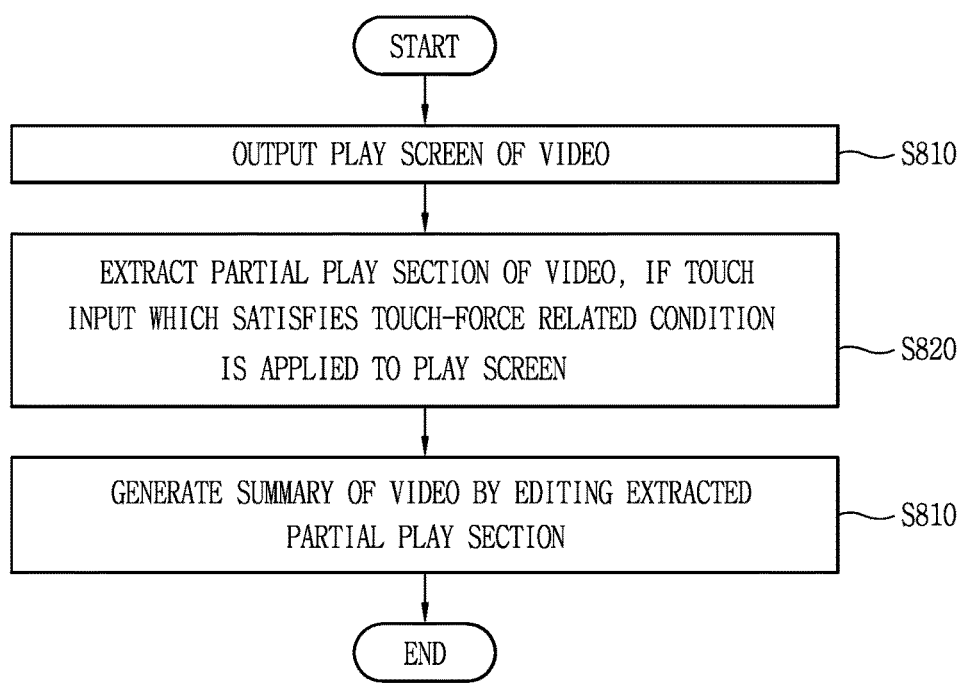
FIG. 8 is a flowchart showing a method for generating a video summary by using a touch input which satisfies a touch force-related condition while a video is being played, in a mobile terminal according to an embodiment of the present invention.

Hereinafter, a method for generating a video summary in the mobile terminal according to an embodiment of the present invention will be explained. In particular, FIG. 8 is a flowchart showing a method for generating a video summary by using a touch input which satisfies a touch force-related condition while a video is being played, in the mobile terminal according to an embodiment of the present invention. Also, FIG. 9 is a conceptual view illustrating a control method of FIG. 8.

Referring to FIG. 8, the controller 180 can output a video play screen (S810). The controller 180 can play a video in response to a user's control command for playing the video. In this instance, as shown in FIG. 9(a), the controller 180 can output a video play screen to the touch screen 151. The video may be stored in the memory 170, or may be received from a broadcasting server in real time. When receiving the video from the broadcasting server, the video can be received in a streaming manner. The controller 180 can extract a partial play section of the video, if a touch input which satisfies a touch force-related condition is applied to a video play screen (S820).

As shown in FIG. 9(a), the controller 180 can sense a force touch input applied to a video play screen while a video is being played. The force touch input may be applied to any region or a specific region of the video play screen. For instance, the force touch input may be applied to an output region of a play icon for playing a video or stopping a video play. In this instance, the controller 180 can set a partial section not to be extracted based on a force touch input applied to any region. Whether to apply a force touch input to any region or a specific region may be preset when the mobile terminal is released from a factory.

As shown in FIG. 9(b), the controller 180 can sense a released state of the force touch input. The released state of the force touch input means a state where the force touch input is not sensed any longer. The controller 180 can extract a video play section corresponding to a time duration from a time when a force touch input has been applied, to a time when the force touch input has been released. For instance, the controller 180 can extract a video play section corresponding to a time duration from a first time when a force touch input has been applied, to a second time when the force touch input has been released.

Once a force touch input is applied, the controller 180 can extract a video play section between a time point before a force touch input application time by a specific time, and a time point after a force touch input release time by the specific time. For instance, the controller 180 can extract a video play section between a time point before a first time when a force touch input has been applied by 5 seconds, and a time point after a second time when the force touch input has been released by 5 seconds. The specific time may be set by a user, or may be preset to a video play program.

The controller 180 can play a video regardless of a force touch input. That is, the controller 180 can not stop the video play even if a force touch input is applied. Accordingly, a user can determine a play section to be extracted with checking the video play in real time.

The controller 180 can extract a plurality of video play sections according to a user's control command. That is, the controller 180 can extract a first play section based on a first force touch input, and extract a second play section based on a second force touch input. That is, in the present invention, a plurality of video play sections can be extracted from a video based on a force touch input while the video is being played.

Based on objects included in the extracted video play sections among objects included in the video, the controller 180 can extract a plurality of video play sections from the video. In this instance, the plurality of extracted video play sections may include the objects included in the firstly-extracted video play sections.

Referring to FIGS. 9(a) to 9(c), the controller 180 can output a progress bar 910 indicating a play state, to a video play screen. The progress bar 910 is output to the video play screen in an overlapped manner, and is a bar type of graphic object indicating a total play time and a current play time of a video. A bar length of the progress bar 910 indicates a total play time, and a graphic object 910a displayed on the progress bar 910 indicates a current play time. The progress bar 910 may be set to temporarily appear and disappear on/from the video play screen, if a touch input is applied to the video play screen.

As shown in FIG. 9(c), when a video play section is extracted, the controller 180 can output the progress bar 910, and output a bar-shaped graphic object 920 in an overlapped manner, to a position corresponding to the video play section among a total play section indicated by the output progress bar 910. Accordingly, a user can intuitively check the position of the extracted video play section.

The controller 180 can generate a video summary by editing the extracted video play section (S830). If a video is stored in the memory 170, the controller 180 can download the extracted video play section from the memory 170. On the contrary, if a video is received from a broadcasting server, the controller 180 can download the extracted video play section from the broadcasting server to store it in the memory 170. Then, if the video play is completed, the controller 180 can download the extracted video play section from the memory 170.

If the video play is completed, the controller 180 can edit the extracted video play section to generate a video summary. The edition may include an operation to reduce or increase a capacity of a play section, an operation to shorten or prolong a play time, and an operation to increase or decrease a play speed. For instance, the controller 180 can reduce a capacity of a play section.

The controller 180 can connect (splice) the edited video play sections to each other in a play time order. Accordingly, the controller 180 can generate a single video summary. The controller 180 can store the edited video play section. With such a configuration, a user can selectively play a partial section of a video, rather than an entire section of the video.

So far, a method for extracting a video play section while a video is being played has been explained. In the present invention, a video play screen can be output and a video play section can be extracted at the same time, through a simple operation differentiated from the conventional touch operation. This allows a user to more conveniently extract a video play section.

Figure 11:
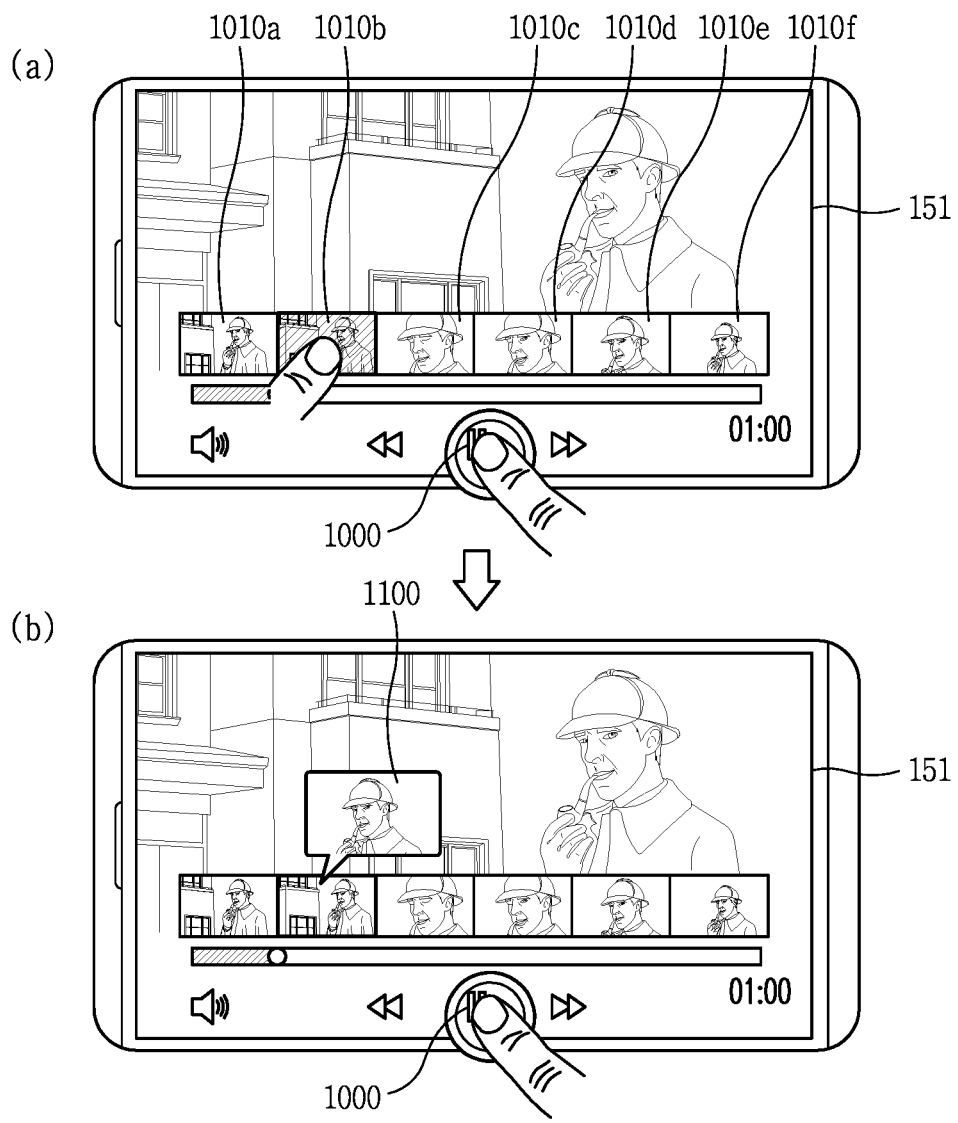

Hereinafter, a method for setting a detailed play section at the time of generating a video summary will be explained. In particular, FIGS. 10 and 11 are conceptual views showing a method for setting a detailed play section at the time of generating a video summary.

Referring to FIG. 10(a), the controller 180 can sense a force touch input applied to an icon 1000 for playing a video and stopping a video play. In this instance, the controller 180 can extract a video play section corresponding to a time duration from a time when a force touch input has been applied, to a time when the force touch input has been released.

As shown in FIG. 10(b), while the force touch input is being continuously sensed, the controller 180 can output a plurality of thumbnail images 1010a, 1010b, 1010c, 1010d, 1010e, 1010f indicating a play section between a predetermined time before a force touch input application time, and a video play termination time. The plurality of thumbnail images 1010a, 1010b, 1010c, 1010d, 1010e, 1010f are contracted images of a representative image among a plurality of images included in the play section.

The controller 180 can extract a play section corresponding to at least one thumbnail image, based on a drag input applied to the at least one thumbnail image 1010b, 1010c, 1010d, 1010e among the plurality of thumbnail images 1010a, 1010b, 1010c, 1010d, 1010e, 1010f. If the force touch input is released, the controller 180 can store the extracted play section in the memory 170. Further, if the force touch input is released, the controller 180 can stop displaying the plurality of thumbnail images 1010a, 1010b, 1010c, 1010d, 1010e, 1010f on the touch screen 151. As a representative image of an entire play section of a video is provided in advance, a user can edit an extracted play section in a more easy and detailed manner.

As shown in FIG. 11(a), if a short touch input is applied to a specific thumbnail image 1010b among the plurality of thumbnail images 1010a, 1010b, 1010c, 1010d, 1010e, 1010f, the controller 180 can provide a play section corresponding to the specific thumbnail image in the form of a preview screen 1100. On the preview screen 1100, a video of the play section corresponding to the specific thumbnail image may be played. That is, a user can check a video play section indicated by a thumbnail image. Accordingly, a user can search and extract a desired play section among an entire play section of a video, more easily.

Hereinafter, a method for controlling a camera preview image by utilizing a force touch input will be explained. In particular, FIGS. 12A and 12B are conceptual views showing a method for controlling a camera preview image by utilizing a touch input which satisfies a touch force-related condition, in the mobile terminal according to an embodiment of the present invention.

The controller 180 of the mobile terminal can receive an image signal from the camera 121 and output the received image signal to the touch screen 151. The image signal output to the touch screen 151 can be called a preview image, which is an image output to the touch screen 151 before an image is captured.

Figure 12A:
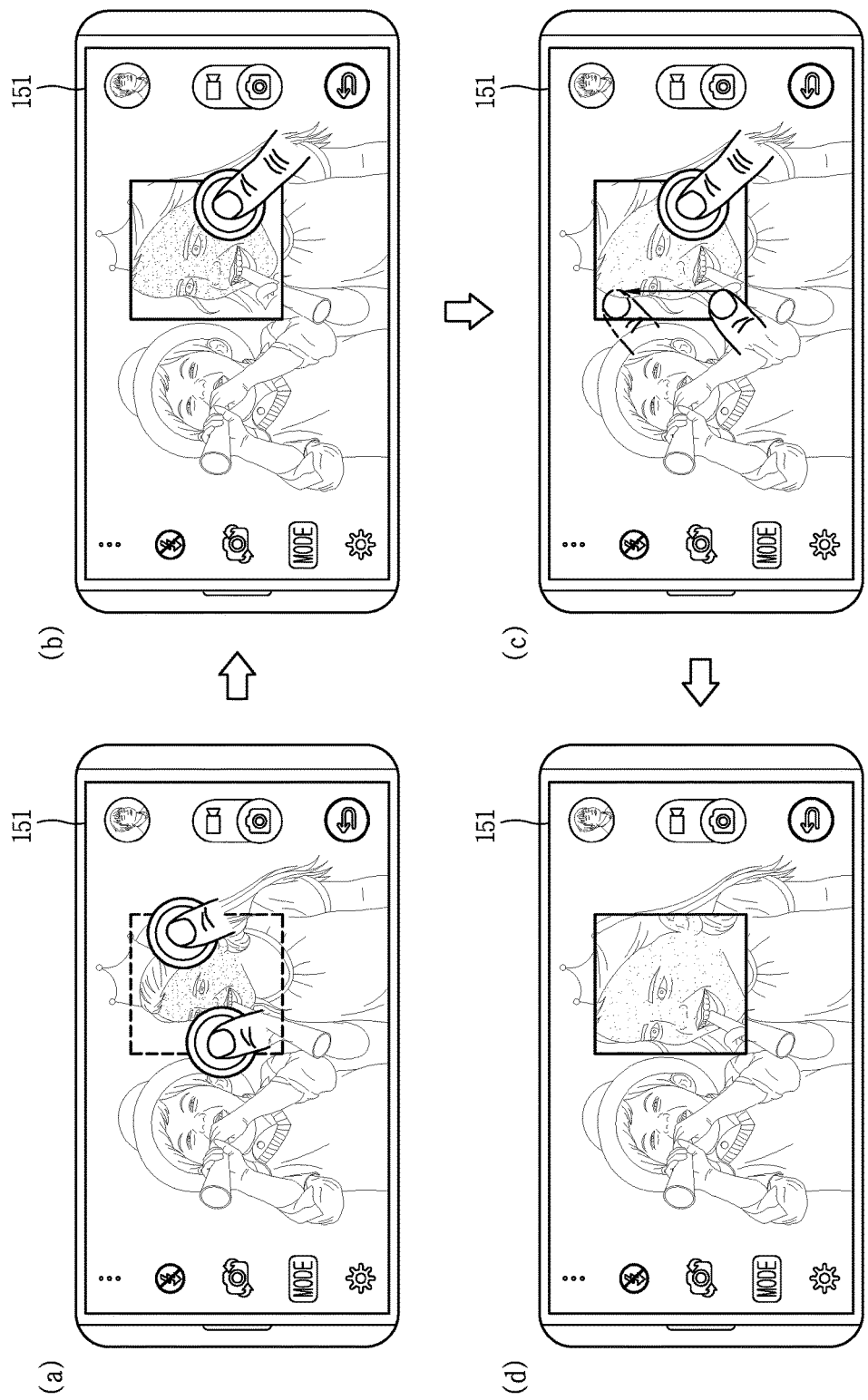
FIGS. 12A and 12B are conceptual views showing a method for controlling a camera preview image by utilizing a touch input which satisfies a touch force-related condition, in a mobile terminal according to an embodiment of the present invention.
Figure 12B:
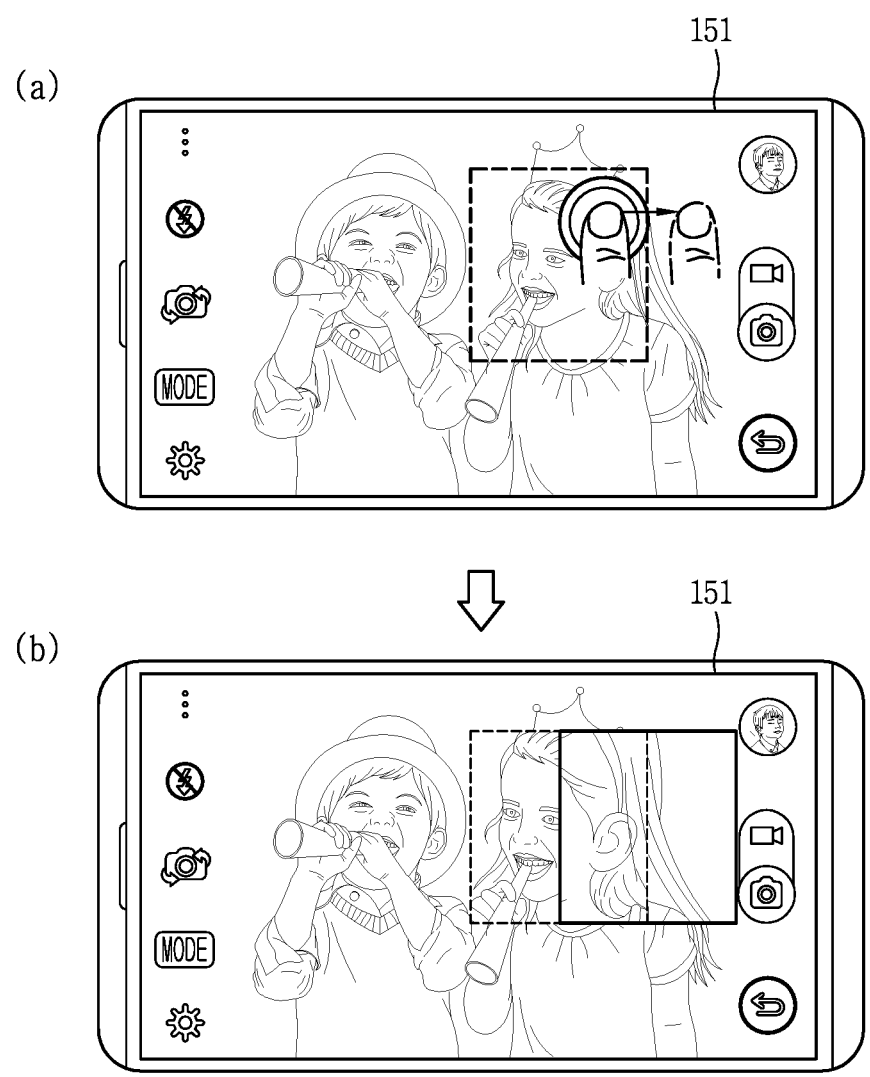

As shown in FIG. 12A(a), the controller 180 can sense a multi force touch input applied to one region of a displayed preview image. The controller 180 can set a specific region based on the region where the multi force touch input has been applied. More specifically, the controller 180 can set two points where a force touch input has been applied as vertexes of a quadrangle, and set an enlarged region of the quadrangle based on the set vertexes.

As shown in FIG. 12A(b), if a force touch input is re-applied to the enlarged region, the controller 180 can enlarge the image displayed on the enlarged region. The controller 180 can set an enlargement ratio of the image based on a touch force of the force touch input. That is, the controller 180 can enlarge the image more when the touch force of the force touch input is higher. For instance, if the touch force of the force touch input is a first force, the controller 180 can enlarge the image with a first ratio. If the touch force of the force touch input is a second force higher than the first force, the controller 180 can enlarge the image with a second ratio larger than the first ratio.

If a drag input in a preset direction is applied together with the force touch input in the enlarged state of the image, the controller 180 can edit the enlarged image. For instance, as shown in FIGS. 12A(c) and (d), if an upward drag input is applied when a force touch input has been applied, the controller 180 can control a brightness of the enlarged image to be high.

When the force touch input is maintained, if a force touch input is applied to another region, the controller 180 can capture the enlarged image. That is, the controller 180 can enlarge a part of a preview image through a software manipulation by a touch input, without a physical manipulation of the camera. Then, the controller 180 can capture the enlarged part of the preview image.

The controller 180 can return the enlarged image to the state before the enlargement, if the force touch input is released. Thus, a user can return the enlarged image to the state before the enlargement, without an additional cancellation command.

The controller 180 can also move the position of the enlarged part according to a user's control command. Referring to FIGS. 12B(a) and (b), the controller 180 can move the position of the enlarged part, if a drag input extending from the force touch input is applied. In this instance, the controller 180 can enlarge the preview image output to the moved enlargement part. Thus, since the present invention provides a method for enlarging a part of a preview image rather than an entire part of the preview image, a user can selectively enlarge a desired region within the preview image.

Figure 13:
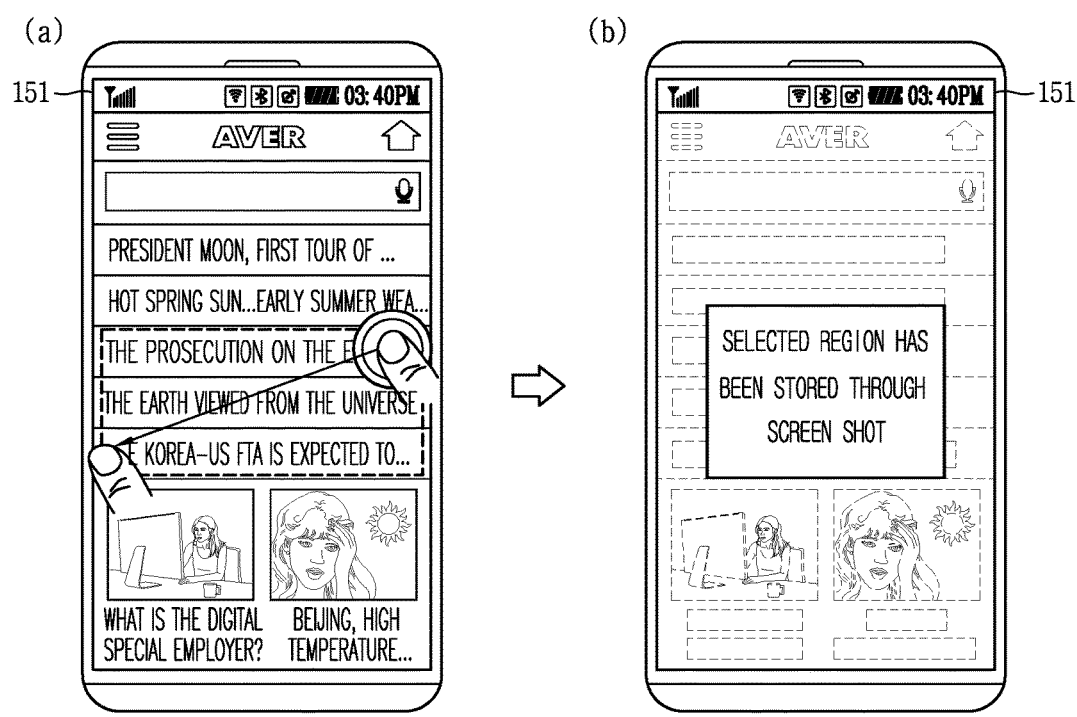
FIG. 13 is a conceptual view showing a method for executing a screen shot function by utilizing a touch input which satisfies a touch force-related condition, in a mobile terminal according to an embodiment of the present invention.

So far, a method for editing a camera preview image using a force touch input has been explained. Hereinafter, a method for performing a screen shot function by utilizing a force touch input will be explained. In particular, FIG. 13 is a conceptual view showing a method for executing a screen shot function by utilizing a force touch input in the mobile terminal according to an embodiment of the present invention.

The controller 180 can execute a screen shot function by utilizing a force touch input. The screen shot function is used to capture screen information displayed on the touch screen. The screen information displayed on the touch screen may include information which can be output visually, such as a web page, a home screen page, an image and a video.

Referring to FIG. 13(a), the controller 180 can output a web page to the touch screen 151. The controller 180 can sense a force touch input applied to one region of the touch screen 151. Then, the controller 180 can sense a drag input applied in a consecutive manner to the force touch input.

Referring to FIG. 13(b), if the drag input is released, the controller 180 can set a capture region from a point where the force touch input has been firstly sensed, to a point where the drag input has been released. Then, the controller 180 can execute a screen shot function with respect to information displayed on the set capture region. In this instance, the controller 180 can output a pop-up window indicating the executed state the screen shot function. That is, a screen shot function may be executed with respect to a part of a screen, by using a force touch input.

Hereinafter, a method for executing a word automatic completion function by utilizing a force touch input, in the mobile terminal according to an embodiment of the present invention will be explained. In particular, FIG. 14 is a conceptual view showing a method for providing a word automatic completion function by utilizing a force touch input.

The controller 180 of the mobile terminal according to an embodiment of the present invention can execute a word automatic completion function based on a force touch input, at the time of inputting a text on a keyboard image. The word automatic completion function is used to output recommended letters (characters) based on history information indicating a character input record. For instance, if a user inputs 'Hel', words such as 'Hello' and 'hell' may be output.

In the related art word automatic completion function, recommended words are output based on input letters (characters). Accordingly, a user should input one or more letters (characters) in order to receive recommended words. However, the controller 180 of the mobile terminal according to an embodiment of the present invention can output recommended words when a force touch input is applied to a key indicating a specific character, based on history information related to the specific character.

Figure 14:
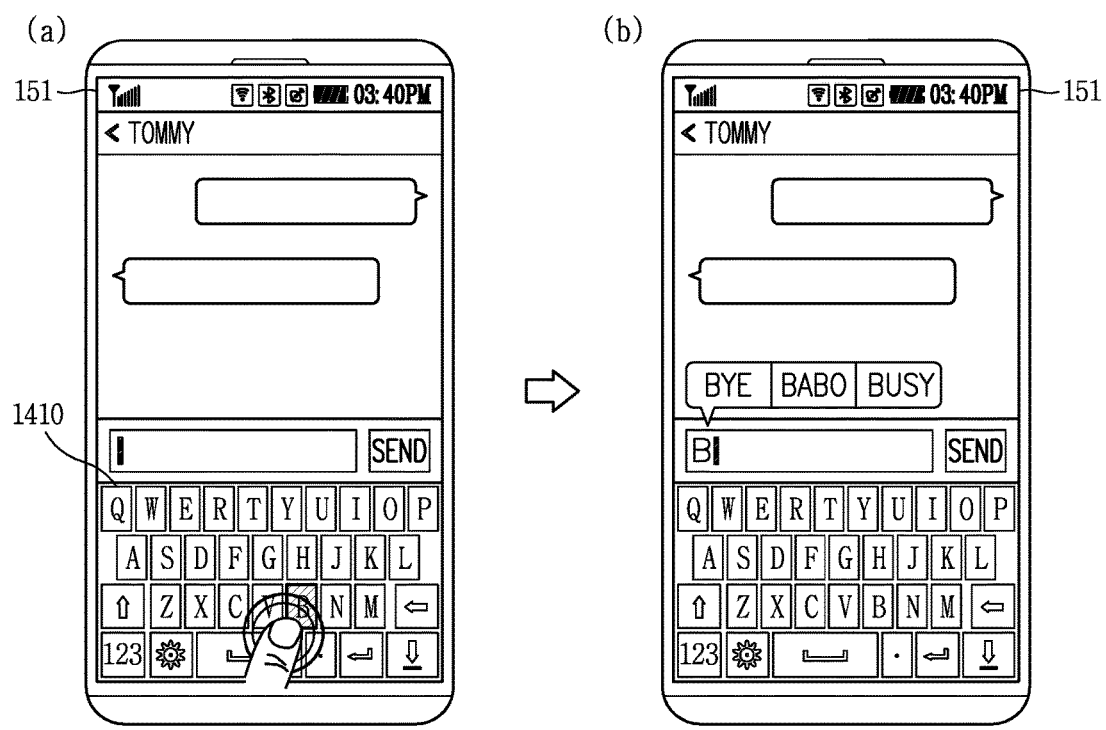
FIG. 14 is a conceptual view showing a method for providing a word automatic completion function by utilizing a touch input which satisfies a touch force-related condition, in a mobile terminal according to an embodiment of the present invention.

More specifically, referring to FIG. 14(*a*), the controller 180 can sense a force touch input applied to a key 1410 indicating a character 'Q'. In this instance, as shown in FIG. 14(*b*), the controller 180 can output 'BYE', 'BABO' and 'BUSY' as recommended words, based on history information related to the character 'Q'. This enhances a user's convenience in inputting characters.

The mobile terminal according to an embodiment of the present invention can search a relevant content related to at least one object among a plurality of objects included in a specific content, if a touch input which satisfies a touch-force related condition is applied to the specific content. This provides the relevant content easily and rapidly.

Further, the mobile terminal according to an embodiment of the present invention can extract a video play section to generate a video summary, if a touch input which satisfies a touch-force related condition is applied to a video play screen while a video is being played. This allows a summary including a desired play section to be generated while a user is checking a video in real time.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen; and
a controller configured to:
display a specific content on the touch screen, wherein the specific content includes a plurality of objects,
in response to a first force touch input satisfying a specific touch-force applied to the specific content, execute an aggregated view mode,
among the plurality of objects when the aggregated view mode is executed,
display a plurality of icons indicating the plurality of objects in the specific content in an aggregated manner when the aggregated view mode is executed,
in response to a first non-force touch input selecting a particular object, distinguishably display the selected particular object on the touch screen, and
in response to a second force touch input satisfying the specific touch-force applied to the specific content, display related contents related to the selected particular object on the touch screen, and
wherein the icons are output to peripheral regions of output regions of the plurality of objects.

2. The mobile terminal of claim 1, wherein the controller is further configured to select the particular object based on the first non-force touch input applied to a respective icon corresponding to the particular object.

3. The mobile terminal of claim 1, wherein the controller is further configured to in response to a second non-force touch input while the first force touch input is maintained, execute a content edition function for editing the displayed related contents.

4. The mobile terminal of claim 3, wherein in response to the second non-force touch input being a leftward drag input or a rightward drag input, the controller is further configured to sequentially scroll and display the related contents.

5. The mobile terminal of claim 3, wherein in response to the second non-force touch input being an upward drag input, the controller is further configured to display a sharing list for sharing the related contents.

6. The mobile terminal of claim 1, wherein the objects include at least one of a person, an object and a place in a background.

7. The mobile terminal of claim 1, wherein in response to the first force touch input no longer being sensed, the controller is further configured to terminate the aggregated view mode.

8. A method of controlling a mobile terminal, the method comprising:
displaying a specific content on a touch screen of the mobile terminal, wherein the specific content includes a plurality of objects;
in response to a first force touch input satisfying a specific touch-force applied to the specific content, executing, via a controller of the mobile terminal, an aggregated view mode;
searching for contents related to the specific content, based on at least one object among the plurality of objects when the aggregated view mode is executed;
displaying a plurality of icons indicating the plurality of objects in the specific content in an aggregated manner when the aggregated view mode is executed;
in response to a first non-force touch input selecting a particular object, distinguishably displaying the selected particular object on the touch screen; and
in response to a second force touch input satisfying the specific touch-force applied to the specific content, displaying related contents related to the selected particular object on the touch screen, and
wherein the icons are output to peripheral regions of output regions of the plurality of objects.

9. The method of claim 8, further comprising:
selecting the particular object based on the first non-force touch input applied to a respective icon corresponding to the particular object.

10. The method of claim 8, further comprising:
in response to a second non-force touch input while the second force touch input is maintained, executing, via the controller, a content edition function for editing the displayed related contents.

11. The method of claim 10, further comprising:
in response to the second non-force touch input being a leftward drag input or a rightward drag input, sequentially scrolling and displaying the related contents.

* * * * *